Nov. 6, 1923.  
E. F. DICK  
AUXILIARY TRANSMISSION  
Filed June 24, 1921

ERNEST F. DICK — INVENTOR.

WITNESSES

BY

ATTORNEY.

Nov. 6, 1923.  1,473,216
E. F. DICK
AUXILIARY TRANSMISSION
Filed June 24, 1921  2 Sheets-Sheet 2
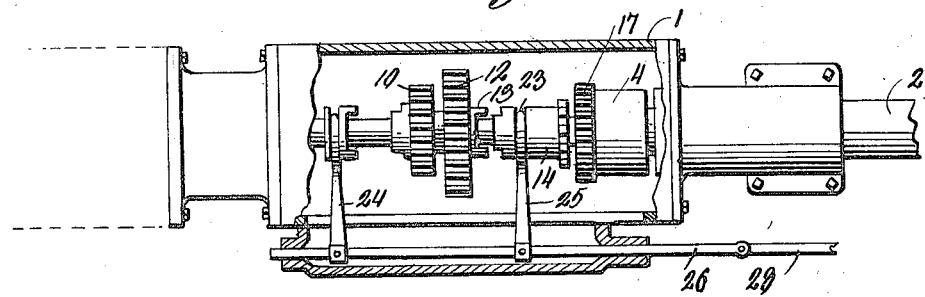
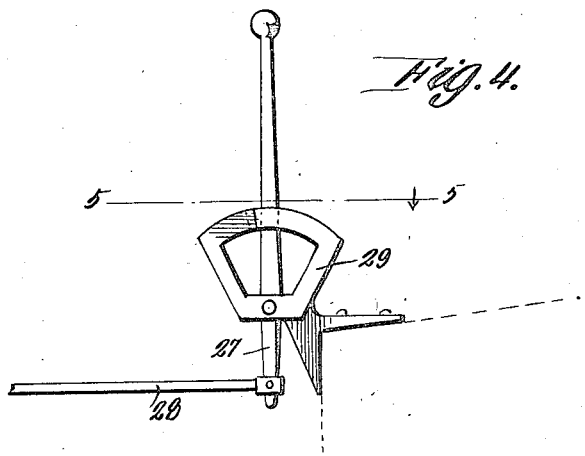
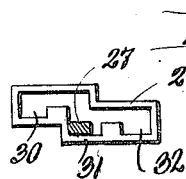
ERNEST E DICK INVENTOR.
BY
ATTORNEY.
WITNESSES Patented Nov. 6, 1923.

1,473,216

UNITED STATES PATENT OFFICE.

ERNEST F. DICK, OF BEND, OREGON.

AUXILIARY TRANSMISSION.

Application filed June 24, 1921. Serial No. 480,154.

*To all whom it may concern:*

Be it known that I, ERNEST F. DICK, a citizen of the United States, residing at Bend, in the county of Deschutes and State of Oregon, have invented certain new and useful Improvements in an Auxiliary Transmission, of which the following is a specification.

This invention relates to an auxiliary transmission which is especially useful with Ford cars and has for its principal object to construct a transmission of this nature which will be of extremely simple, durable and inexpensive construction, one which is efficient and reliable in operation, and well adapted to the purpose for which it is designed.

With the above and numerous other objects in view, the invention resides in certain novel features of construction, and the combination and arrangement of parts as will be hereinafter fully described and claimed.

In the drawing:—

Figure 3 is a horizontal section taken therethrough,

Figure 4 is an elevational view of the controlling lever, and

Figure 5 is a section taken on the line 5—5 of Figure 4 looking in the direction of the arrow.

Figure 1:
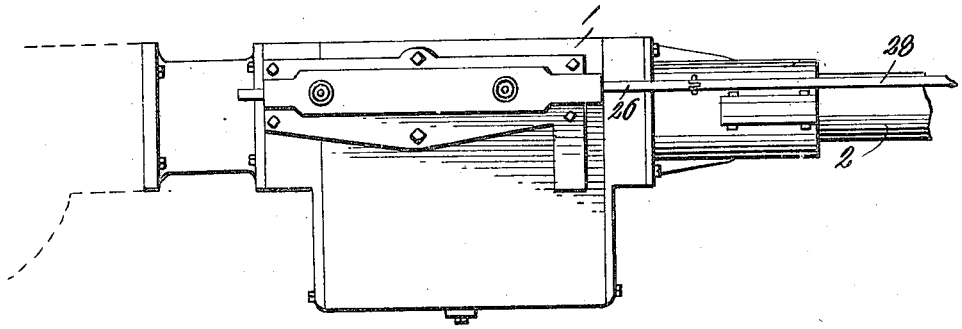
Figure 1 is a side elevational view of the auxiliary transmission.
Figure 2:
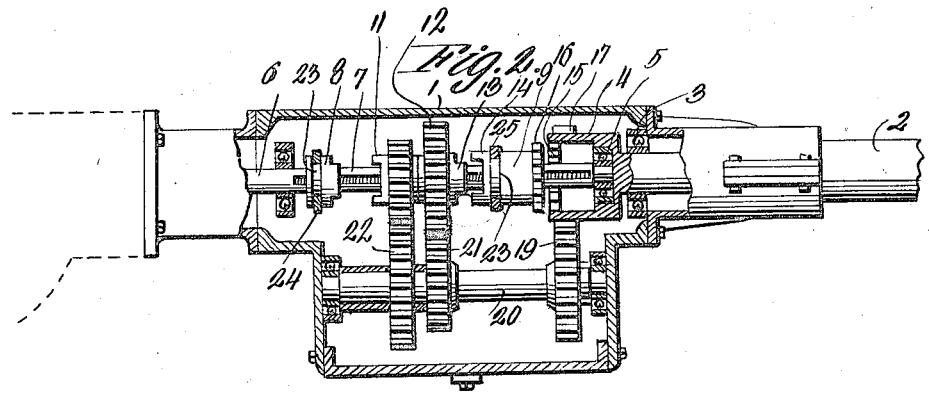
Figure 2 is a vertical section taken therethrough.

Referring to the drawing in detail it will be seen that 1 designates the auxiliary transmission casing which is adapted to be interposed between the differential and transmission on a Ford car. The drive shaft 2 extends into the transmission casing 1 and is suitably journaled therein as shown at 3 and is provided at its terminal within the casing 1 with a cylindrical member 4 in which is journaled at 5 the driven shaft 6 which is extended through the casing 1 to the differential of the automobile. It will be noted that this shaft 6 is splined as shown at 7 throughout its length within the casing 1 so as to slidably receive the clutch member 8 and the clutch member 9.

A gear 10 is rotatably mounted on the shaft 6 and is provided with the clutch element 11 adapted to be engaged by the clutch member 8. A second gear 12 is rotatably mounted on the shaft 6 and is provided with the clutch element 13 adapted to be engaged by the clutch element 14 of the clutch member 9. When the transmission is in what is known as a neutral position the shaft 6 may idle and move independently of the gears 10 and 12. The cylindrical member 4 is provided with internal teeth 15 adjacent its open end which are adapted to be engaged by the teeth 16 provided on the end of the clutch member 9. This cylindrical member 4 is also provided with external teeth 17 which are always in mesh with the gear 19 keyed to the counter shaft 20. The gears 21 and 22 which are keyed to the counter shaft 20 are likewise always in mesh with the gears 12 and 10 respectively.

The clutch member 8 and the clutch member 9 are provided with annular grooves 23 for receiving the rods 24 and 25 which are provided with bifurcated end portions and are suitably fixed to the bar 26 which is connected to the lever 27 through the intermediacy of the link 28. This lever 27 is suitably mounted or fulcrumed in the bracket 29 the construction of which is shown to advantage in Figure 5 whereby the lever may be placed in various positions for accurately operating or setting the transmission.

When the lever 27 is in notch 30 it should be understood that the link, bar, and rods 24 and 25 will be pulled so as to place the gear element 16 inside of the cylindrical member 4. When the lever 27 is in notch 31 the teeth 16 are in mesh with the internal teeth 15 and the usual Ford transmission will now act directly through the shafts 2 and 6. When the lever 27 is in notch 32 the clutch elements 13 and 14 should be engaged whereby the shaft 6 will be rotated through the intermediacy of the external teeth 17, gear 19, counter shaft 20, gears 21 and 12.

It will be readily understood that the various gears 12, 10, 21, 22 and 19 may be of any preferred size so as to change the relative speed of the shaft 6 in relation to the shaft 2.

From the foregoing description, taken in connection with the accompanying drawings, the construction and operation of the transmission will be readily understood without a more extended explanation. As numerous changes in form, proportion and in the minor details of construction may be resorted to without departing from the spirit of this invention, I do not wish to be limited to the construction herein shown and described other than as claimed.

Having thus described my invention, what I claim as new is:—

In combination, a casing, a drive shaft extending into the casing and journaled therein, a cylindrical member on the drive shaft, a driven shaft extending into the casing and journaled in the cylindrical member, a pair of clutch members rotatable with and slidable on the driven shaft, one of which is movable into and out of the cylindrical member, a gear rotatable on the driven shaft, a clutch element fixed thereto and engageable with one of the aforesaid elements which is not slidable within the cylindrical member, a second gear rotatable on the driven shaft, a clutch element fixed thereto and engageable by the other of the first mentioned clutch elements which is slidable within the cylindrical member, external teeth on the last mentioned clutch element which is slidable within the cylindrical member, internal teeth on the cylindrical member engageable by the external teeth, a countershaft journaled in the casing, external teeth on the cylindrical member, three gears keyed to the countershaft, two of which are in mesh with the gears on the driven shaft and the remaining gear in mesh with the external teeth on the cylindrical member, and means for shifting the two first mentioned clutch elements.

In testimony whereof I affix my signature in presence of two witnesses.

ERNEST F. DICK.

Witnesses:
CARLA JOHNSON,
T. A. BENSON.